United States Patent
Moon et al.

(10) Patent No.: US 8,385,679 B2
(45) Date of Patent: Feb. 26, 2013

(54) APPARATUS AND METHOD FOR ENHANCING IMAGE BASE ON LUMINANCE INFORMATION OF PIXEL

(75) Inventors: Young Su Moon, Seoul (KR); Shi Hwa Lee, Seoul (KR); Ho Jin Lee, Seoul (KR); Joon Hyuk Cha, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 845 days.

(21) Appl. No.: 12/457,202

(22) Filed: Jun. 3, 2009

(65) Prior Publication Data

US 2010/0142847 A1    Jun. 10, 2010

(30) Foreign Application Priority Data

Dec. 5, 2008  (KR) ................ 10-2008-0123412

(51) Int. Cl.
  *G06K 9/40* (2006.01)
(52) U.S. Cl. ............. 382/274; 345/77; 345/63; 348/254
(58) Field of Classification Search .......... None
  See application file for complete search history.

(56) References Cited

U.S. PATENT DOCUMENTS

| | | | |
|---|---|---|---|
| 5,949,496 A * | 9/1999 | Kim ........................ | 348/645 |
| 6,340,996 B1 * | 1/2002 | Nakamura .................... | 348/675 |
| 7,369,183 B2 | 5/2008 | Oka et al. | |
| 2005/0226526 A1 * | 10/2005 | Mitsunaga ................... | 382/274 |
| 2006/0061842 A1 * | 3/2006 | Oka et al. ................... | 358/522 |
| 2008/0007494 A1 * | 1/2008 | Kim et al. .................... | 345/77 |
| 2008/0100858 A1 * | 5/2008 | Kondo ........................ | 358/1.9 |
| 2009/0003697 A1 * | 1/2009 | Lee ............................. | 382/167 |
| 2009/0129698 A1 * | 5/2009 | Wang et al. ................. | 382/274 |

FOREIGN PATENT DOCUMENTS

| | | |
|---|---|---|
| EP | 1868374 A2 * | 12/2007 |
| JP | 2007-171258 | 7/2007 |
| KR | 2001-0092306 | 10/2001 |
| KR | 10-2005-0016809 | 2/2005 |
| KR | 10-2006-0084603 | 7/2006 |
| KR | 10-2007-0076131 | 7/2007 |
| KR | 10-2008-0042402 | 5/2008 |
| KR | 10-2008-0048894 | 6/2008 |
| KR | 10-2008-0089990 | 10/2008 |

* cited by examiner

*Primary Examiner* — Andrew W Johns
*Assistant Examiner* — Siamak Harandi
(74) *Attorney, Agent, or Firm* — Staas & Halsey LLP

(57) ABSTRACT

An image enhancement apparatus and method based on luminance information of a pixel. The image enhancement apparatus may determine luminance data of each of a plurality of pixels, and may adaptively determine a conversion ratio according to the luminance data to apply the conversion ratio to an input image, thereby performing image-enhancing. The image enhancement apparatus may adaptively converse the input image according to luminance data, thereby precisely and effectively performing image-enhancing.

17 Claims, 11 Drawing Sheets under 35 U.S.C. § 119(a)# APPARATUS AND METHOD FOR ENHANCING IMAGE BASE ON LUMINANCE INFORMATION OF PIXEL

CROSS-REFERENCE TO RELATED APPLICATIONS

This application claims the benefit under 35 U.S.C. §119(a) of a Korean Patent Application No. 10-2008-0123412, filed on Dec. 5, 2008, in the Korean Intellectual Property Office, the entire disclosure of which is incorporated herein by reference.

BACKGROUND

1. Field

Example embodiments relate to an image processing technology, and more particular, to an apparatus and method for enhancing an image based on luminance information of a pixel by adaptively determining a gamma constant according to the luminance information of the pixel.

2. Description of the Related Art

In general, an image inputted by an image input device includes various information for an object, but there is difficulty in exactly expressing a feature of the object since a component of a luminance signal is excessively concentrated or distorted by a condition of the input device.

To improve the distorted luminance signal, it is possible to analyze the image and process the image by providing a different enhancement gain depending on the image, and thereby brightening a dark image and relatively emphasizing a dark area of a bright image.

In this instance, brightness correction is applicable to the distorted image, but brightness enhancement with respect to the image without distortion is limited, and thus, there is a case where an original input signal value is outputted as is. In the same manner, when the same method is applied to a moving picture, a flickering phenomenon may occur due to an enhancement/attenuation gain difference between frames. Also, since the image process is performed with respect to an entire image, a degree of enhancement of the image may be insignificant.

Accordingly, a method of improving a quality of an image by exactly performing image processing based on information of pixels constituting the image is required.

SUMMARY

According to example embodiments, there is provided an image enhancing apparatus including a luminance data determining unit to determine luminance data of each of a plurality of pixels constituting an input image, a gamma constant determining unit to determine a gamma constant of each of the pixels using the luminance data, and an image-enhancing performing unit to perform image-enhancing upon the input image using an image conversion ratio based on the gamma constant.

The luminance data determining unit may include a luminance calculating unit to calculate a luminance value of each of the pixels by performing luminance conversion with respect to the input image, an accumulated luminance value calculating unit to calculate an accumulated luminance value of each of the pixels by accumulating the luminance values according to a position of each of the pixels, and an average luminance value calculating unit to calculate an average luminance value of each of the pixels using the accumulated luminance value.

The gamma constant determining unit may include a first gamma constant determining unit to determine a first gamma constant of each of the pixels based on the luminance value of each of the pixels, and a second gamma constant determining unit to determine a second gamma constant of each of the pixels based on the luminance value and the average luminance value of each of the pixels.

The image-enhancing performing unit may include a conversion ratio determining unit to determine a conversion ratio between an input luminance value and an output luminance value with respect to each of the pixels by generating a gamma curve according to the gamma constant, and a conversion ratio applying unit to apply the conversion ratio to each of a plurality of color channels constituting each of the pixels of the input image.

According to example embodiments, there is provided an image enhancing method including determining luminance data of each of a plurality of pixels constituting an input image, determining a gamma constant of each of the pixels using the luminance data, and performing image-enhancing upon the input image using an image conversion ratio based on the gamma constant.

Additional aspects, features, and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION

Figure 1:
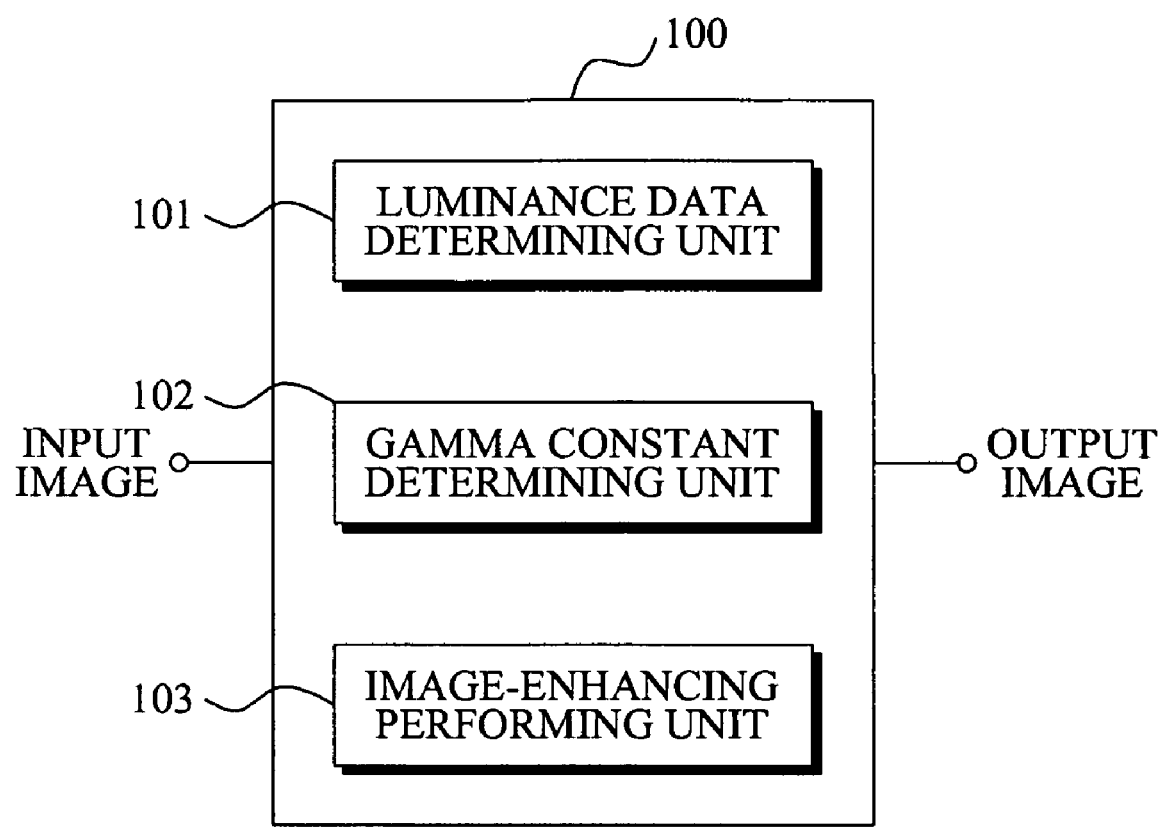
FIG. 1 illustrates a block diagram of an entire configuration of an image enhancement apparatus according to example embodiments.

Reference will now be made in detail to the embodiments, examples of which are illustrated in the accompanying drawings, wherein like reference numerals refer to the like elements throughout. The embodiments are described below to explain the present invention by referring to the figures.

FIG. 1 illustrates a block diagram of an entire configuration of an image enhancement apparatus according to example embodiments.

Referring to FIG. 1, the image enhancement apparatus 100 may include a luminance data determining unit 101, a gamma constant determining unit 102, and an image-enhancing performing unit 103.

The luminance data determining unit 101 may determine luminance data of each of a plurality of pixels constituting an input image. As an example, the luminance data determining unit 101 may determine luminance data for each of the pixels within each frame of the input image. In this instance, the luminance data may include a luminance value and an average luminance of each of the pixels. The luminance data determining unit 101 will be described in detail with reference to FIGS. 2 through 4 later.

The gamma constant determining unit 102 may determine a gamma constant of each of the pixels using the luminance data. In this instance, the gamma constant is a parameter applied to a gamma curve that represents a relationship between an input luminance value and output luminance value of a pixel. The gamma curve is concave, as the gamma constant becomes greater than one, and thus, the output luminance value is less than the input luminance value. Conversely, the gamma curve is convex, as the gamma constant becomes less than one, and thus, the output luminance value is greater than the input luminance value.

The gamma constant determining unit 102 according to example embodiments may adaptively determine the gamma constant with respect to each of the pixels based on luminance data of each of the pixels. Particularly, the gamma constant determining unit 102 may determine a first gamma constant and a second gamma constant, the first gamma constant being determined according to a luminance value indicating a unique feature of a pixel and the second gamma constant corresponding to an average luminance value indicating a luminance relation between adjacent pixels with respect to the pixel. Also, the gamma constant determining unit 102 may determine a gamma constant by summing up the first gamma constant and the second gamma constant.

The image enhancing performing unit 103 may perform image-enhancing with respect to the input image using an image conversion ratio based on the gamma constant. In this instance, the image conversion ratio is a ratio of the input luminance value and the output luminance value with respect to each of the pixels. The image enhancing performing unit 103 may identically apply the image conversion ratio to each of channels (R, G, and B) constituting each of the pixels, thereby performing image-enhancing for each pixel. The image enhancing performing unit 103 will be described in detail below with reference to FIGS. 9 and 10.

Figure 2:
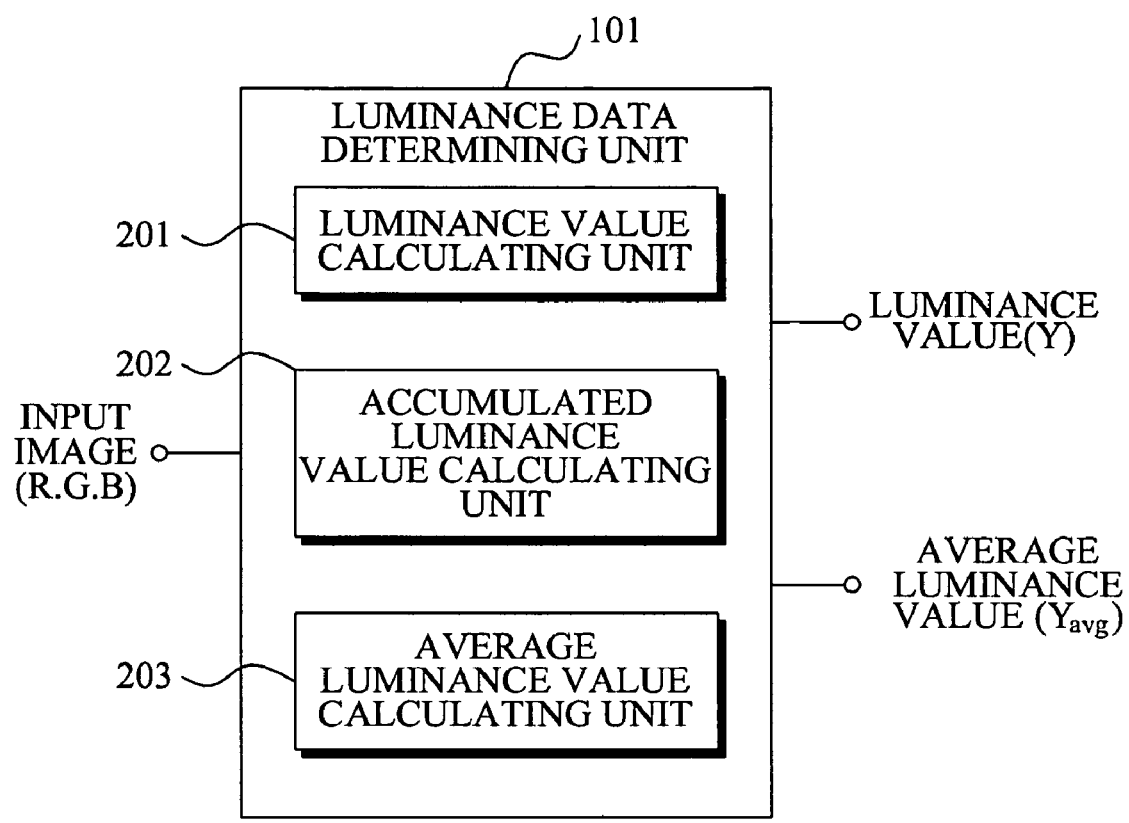
FIG. 2 illustrates a block diagram of an entire configuration of a luminance data determining unit, for example, the luminance data determining unit of FIG. 1.

FIG. 2 illustrates a block diagram of an entire configuration of the luminance data determining unit, for example, the luminance data determining unit 101 of FIG. 1.

Referring to FIG. 2, the luminance data determining unit 101 may include a luminance value calculating unit 201, an accumulated luminance value calculating unit 202, and an average luminance value calculating unit 203.

The luminance value calculating unit 201 may calculate a luminance value of each of a plurality of pixels by performing luminance conversion with respect to an input image. In this instance, the input image may be constituted by pixels in a RGB color space. As an example, the luminance value calculating unit 201 may calculate a luminance value of a pixel using respective R, G, and B channel values of the pixel.

In this instance, the luminance value calculating unit 201 may perform luminance conversion with respect to the input image according to Equation 1, for example, given as below.

$$Y = a_1 * R + a_2 * G + a_3 * B \qquad \text{Equation 1:}$$

Here, $a_1$, $a_2$, and $a_3$ are coefficients respectively applied to R, G, and B channels. Equation 1 is merely an example, and a luminance value of a pixel may be determined based on another algorithm besides Equation 1.

The accumulated luminance value calculating unit 202 may accumulate a luminance value according to a position of each of the plurality of pixels to calculate the accumulated luminance value of each of the pixels. To determine an average luminance value of each of the pixels, the accumulated luminance value calculating unit 202 may calculate the accumulated luminance value of each of the pixels. That is, an accumulated luminance value for each of all the pixels constituting the input image may be calculated according to a position of each of the pixels. A detailed example of calculating the accumulated luminance value will be described in detail with reference to FIG. 3.

The average luminance value calculating unit 203 may calculate the average luminance value of each of the pixels using the accumulated luminance value. As an example, the average luminance value calculating unit 203 may apply a mask with respect to each of the pixels, and calculate the average luminance value using an accumulated luminance value of pixels existing on the mask and a size of the mask.

Here, the average luminance value is a parameter indicating whether the pixel is brighter than adjacent pixels. That is, with respect to a certain pixel, when a luminance value of the pixel is high but is darker than adjacent pixels, the average luminance value of the pixel may be low. That is, the average luminance value is a parameter indicating a local feature with respect to the pixel. A detailed example of calculating an average luminance value will be described with reference to FIG. 4.

Accordingly, the luminance data determining unit 101 may determine a luminance value (Y) and an average luminance value ($Y_{avg}$) which are luminance data with respect to each of the pixels.

Figure 3:
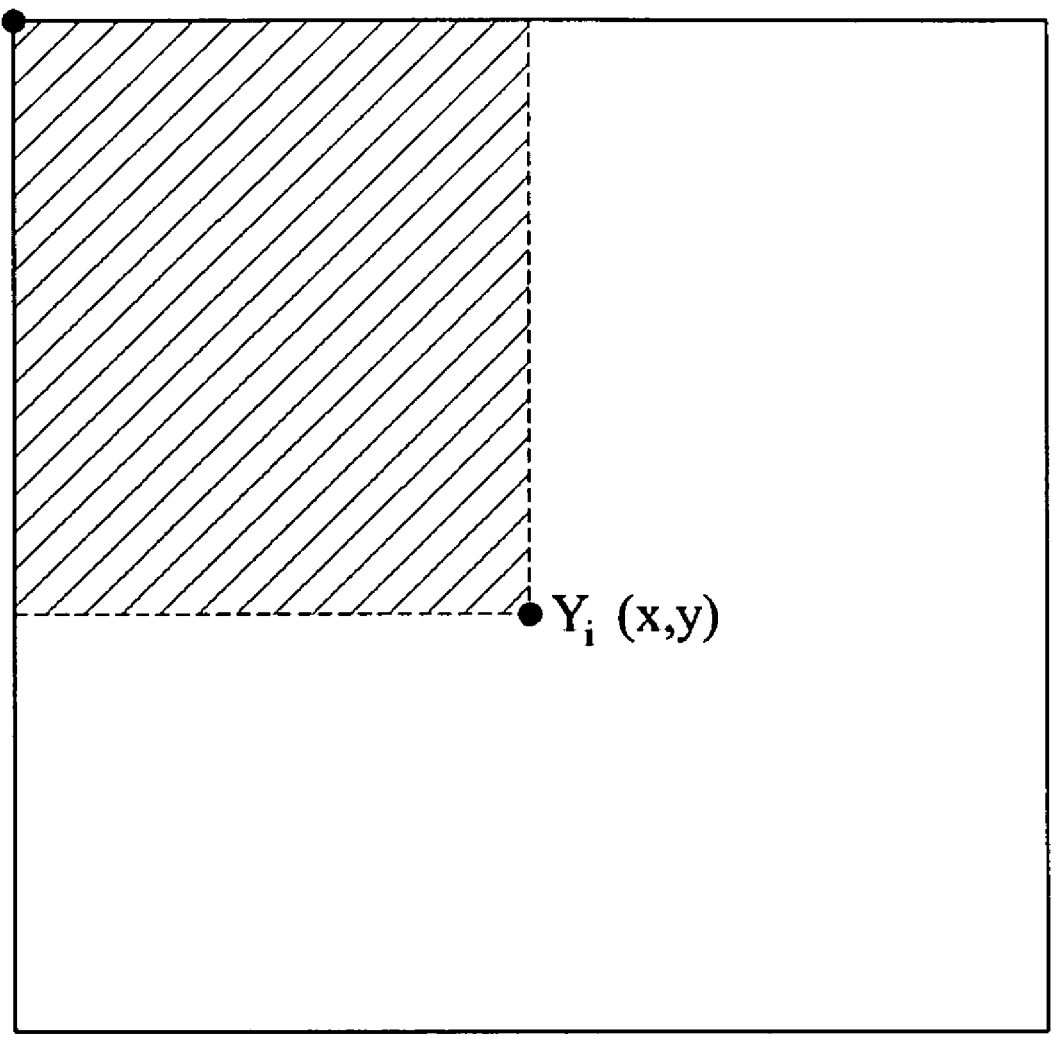
FIG. 3 illustrates a process of calculating an accumulated luminance value of a pixel according to example embodiments.

FIG. 3 illustrates a process of calculating an accumulated luminance value of a pixel according to example embodiments.

FIG. 3 illustrates a single frame of an input image. Coordinates of a pixel positioned in a left-top of the frame is determined as (0, 0). An accumulated luminance value of each of pixels included in the frame may be calculated by scanning from the pixel at (0, 0). In this instance, luminance value of each of the pixels may be determined before calculating the accumulated luminance value. In this instance, $Y_i(x, y)$ is an accumulated luminance value representing the accumulation of a luminance value of a pixel at (0, 0) through a luminance value of a pixel at (x, y).

The accumulated luminance value calculating unit 202 (FIG. 2) may calculate a luminance value of each of the pixels by an accumulating luminance value according to a position of each of the pixels. As an example, the accumulated luminance value calculating unit 202 (FIG. 2) may calculate the accumulated luminance value of each of the pixels according to Equation 2, for example, given as below.

$$Yi(x, y) = Yi(x-1, y) + Y(x, y) \quad \text{Equation 2}$$

$$Y_i = \sum_{P=(0,0)}^{(x,y)} Y(p)$$

According to Equation 2, the accumulated luminance value of the pixel at (x, y) may be determined by summing up an accumulated luminance value of a pixel at (x−1, y) and a luminance value of the pixel at (x, y). Accordingly, a luminance value with respect to each of the pixels may be determined according to Equation 2.

FIG. 3 illustrates a process of determining the accumulated luminance value in a right-hand direction, but this accumulation direction is merely an example. An accumulated luminance value of a pixel may be variously calculated depending on a system.

Figure 4:
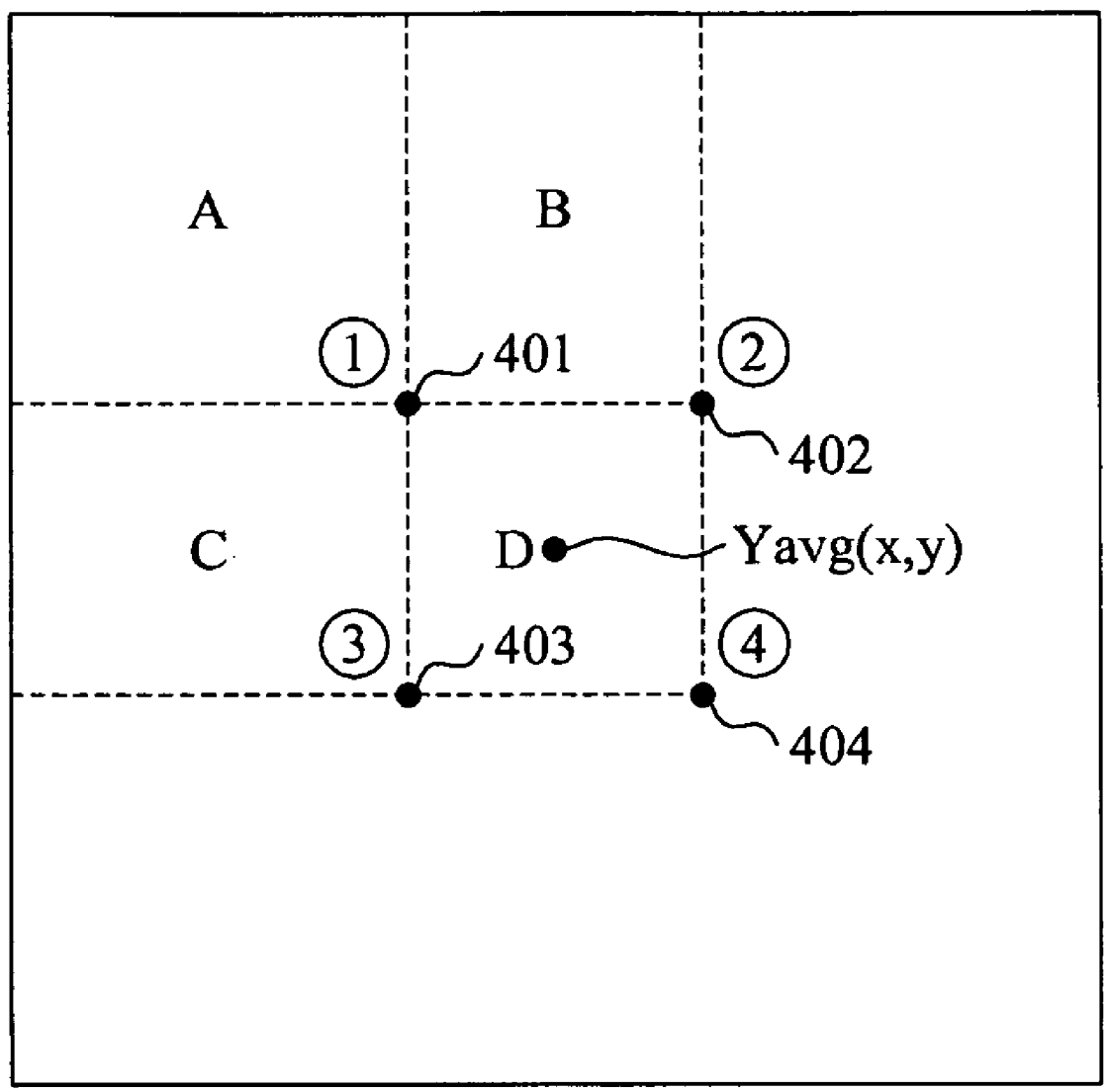
FIG. 4 illustrates a process of calculating an average luminance value of a pixel according to example embodiments.

FIG. 4 illustrates a process of calculating an average luminance value of a pixel according to example embodiments.

In FIG. 4, an accumulated luminance value with respect to each of all pixels included in a frame is determined. As an example, an average luminance value calculating unit 203 (FIG. 2) may apply a mask to each of the pixels, and may calculate an average luminance value of each of the pixels using luminance values of pixels existing on the mask and a size of the mask.

In this instance, the average luminance value calculating unit 203 (FIG. 2) may calculate the average luminance value of each of the pixels according to Equation 3, for example, given as below.

$$Y_{avg}(x,y) = (Yi(4) - Yi(2) - Yi(3) + Yi(1))/\text{Area}(D) \quad \text{Equation 3:}$$

Here, $Y_{avg}(x, y)$ indicates an average luminance value of pixels included in a mask area D centered on a pixel at (x, y). Yi(1) is a pixel 401 which is positioned at a corner of the mask, Yi(2) is a pixel 402 which is positioned at a corner of the mask, Yi(3) is a pixel 403 which is positioned at a corner of the mask, and Yi(4) is a pixel 404 which is positioned at a corner of the mask. Area (D) indicates an area size of a pixel of the mask area D. In this instance, the size of the pixel of the mask area may be dimensions of the mask area.

That is, referring to Equation 3, the accumulated luminance value of the mask area may be calculated by subtracting accumulated luminance values of the pixels 402 and 403 from an accumulated luminance value of the pixel 404, and adding an accumulated luminance value of the pixel 401 to the accumulated luminance value of the pixel 404. Also, the average luminance value calculating unit 203 (FIG. 2) divides the calculated accumulated luminance value of the mask area by the size of the mask area to calculate an average luminance value with respect to a central pixel of the mask area, (x, y).

In this instance, the average luminance value indicates a relative-brightness relation between the pixels included in the mask area and the central pixel of the mask.

The process of calculating the average luminance value with reference to FIG. 4 is merely an example, various processes may be applicable depending on a system.

Figure 5:
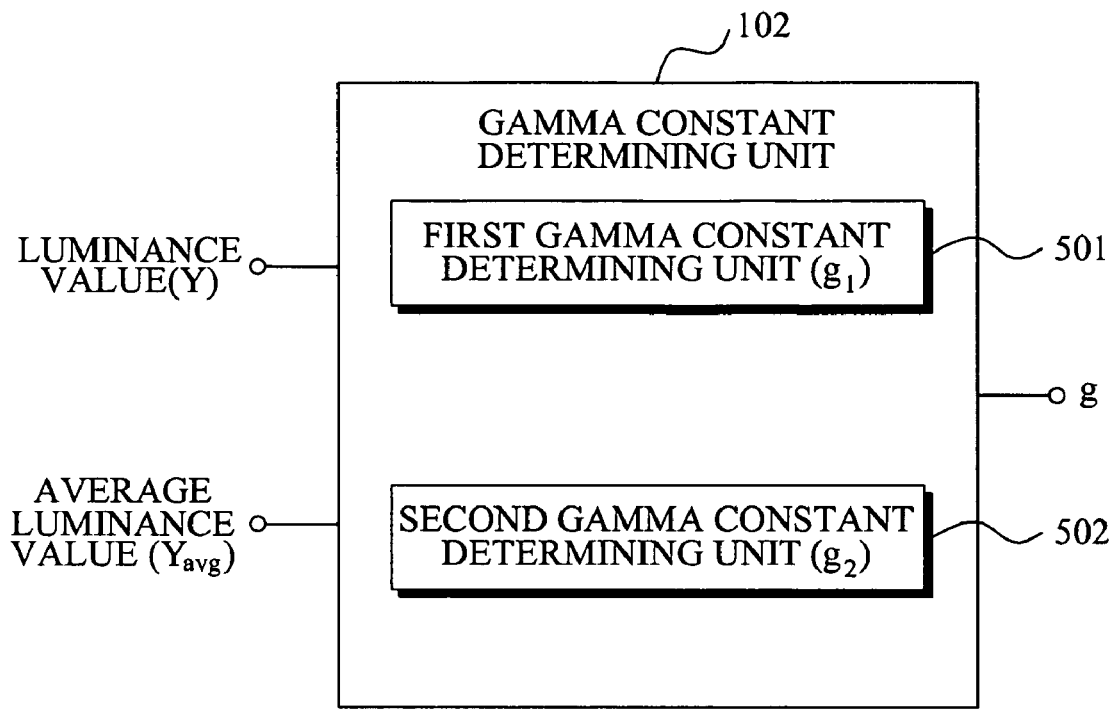
FIG. 5 illustrates a block diagram of an entire configuration of a gamma constant determining unit, for example, the gamma constant determining unit of FIG. 1.

FIG. 5 illustrates a block diagram of an entire configuration of the gamma constant determining unit, for example, the gamma constant determining unit 102 of FIG. 1.

Referring to FIG. 5, the gamma constant determining unit 102 may include a first gamma constant determining unit 501 and a second gamma constant determining unit 502.

The first gamma determining unit 501 may determine the first gamma constant $g_1$ of each of pixels based on a pixel value Y of each of the pixels. That is, the first gamma constant determining unit 501 may determine the first gamma constant $g_1$ based on a unique luminance value of each of the pixels.

The second gamma constant determining unit 502 may determine a second gamma constant $g_2$ of each of the pixels based on the luminance value Y of each of the pixels and the average value $Y_{avg}$ of each of the pixels. That is, the second gamma constant determining unit 502 may determine the second gamma constant based on the unique luminance value of each of the pixels and the average luminance value which considers luminance values of adjacent pixels.

Accordingly, the gamma constant determining unit 102 may adaptively determine a gamma constant according to luminance data of a pixel. The gamma constant determining unit 102 may determine a gamma constant g by summing up the first gamma constant and the second constant. In this instance, the determined gamma constant may be applicable to a gamma curve which indicates a relation between an input luminance value and an output luminance value of each of the pixels.

Figure 6:
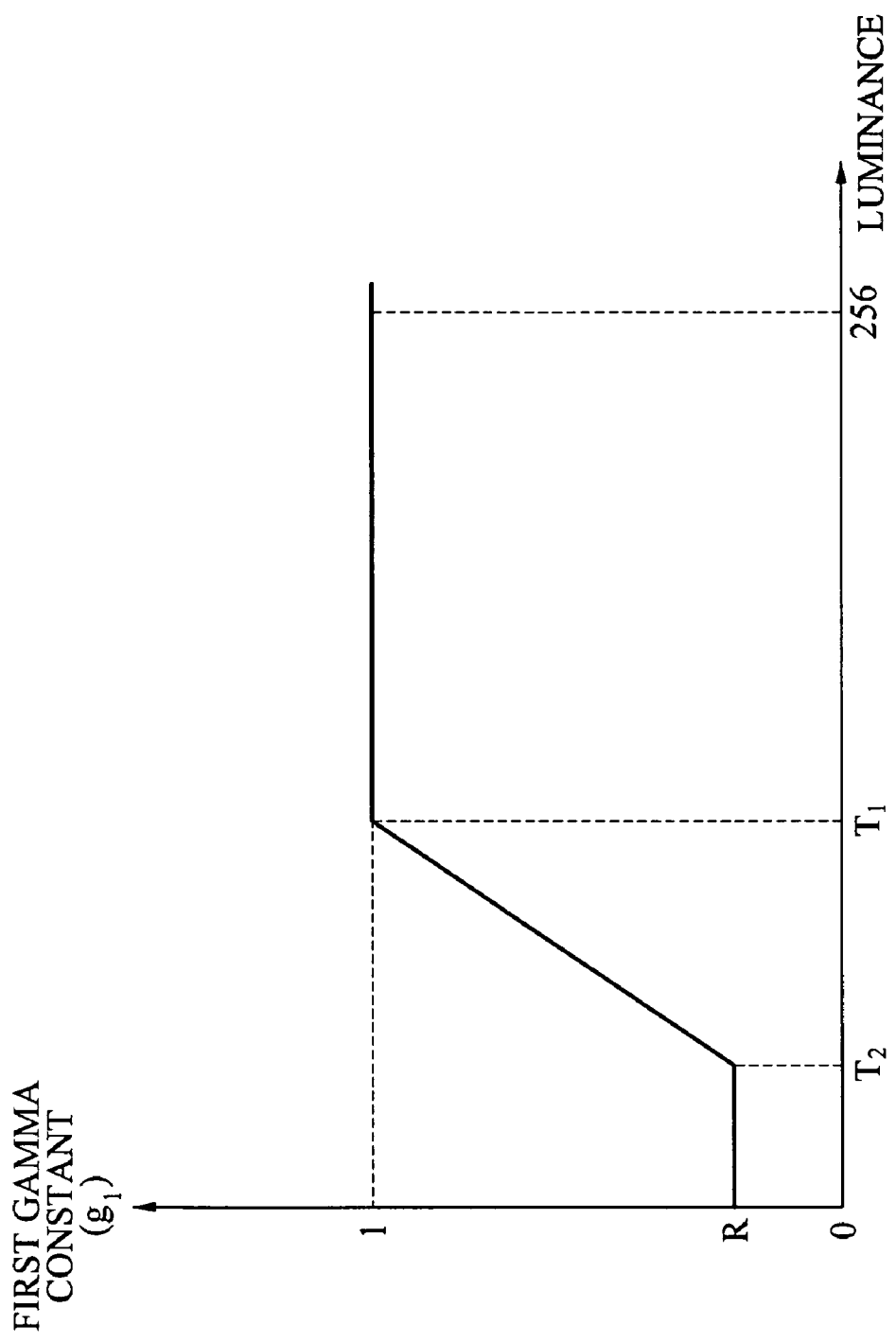
FIG. 6 illustrates an example of determining a first gamma constant based on a luminance value of a pixel according to example embodiments.

FIG. 6 illustrates an example of determining a first gamma constant $g_1$ based on a luminance value of a pixel according to example embodiments.

Referring to FIG. 6, there is a graph in which the first gamma constant $g_1$ is determined according to a luminance value of each of pixels.

A first gamma constant determining unit 501 (FIG. 5) may determine a first gamma constant $g_1$ of each of the pixels based on a luminance value of each of the pixels. As an example, the first gamma constant determining unit 501 (FIG. 5) may determine a first gamma constant $g_1$ that increases a luminance of each of the pixels, when a luminance value of each of the pixels is less than or equal to a predetermined standard luminance value. Conversely, the first gamma constant determining unit 501 (FIG. 5) determines a first gamma constant $g_1$ that maintains luminance of the pixels, when the luminance value of each of the pixels is greater than the predetermined standard luminance value.

Here, the first gamma constant $g_1$ that increases the luminance of each of the pixels may indicate a value less than one, and the first gamma constant $g_1$ that maintains the luminance of the pixels may indicate one. Therefore, the gamma constant may be applied to the gamma curve as an exponent. Therefore, when the gamma constant is less than one, the gamma curve is convex, thereby obtaining an output luminance value greater than an input luminance value.

Referring to FIG. 6, it is assumed that an input image is eight bits. When a luminance value of a pixel is greater than a predetermine luminance value $T_1$ and less than or equal to "255", the first gamma constant $g_1$ may be determined as one. As an example, $T_1$ may be an intermediate value, "128", of "0" through "255". Also, when the luminance value of the pixel is less than or equal to a predetermine $T_1$ and greater than a predetermined $T_2$, the first gamma constant $g_1$ may be determined to be less than one as the luminance value decreases. Also, when the luminance value of the pixel is less than or equal to the predetermined luminance value $T_2$, the first gamma constant $g_1$ may be determined as a predetermined gamma constant R.

Referring to a graph of FIG. 6, with respect to a pixel having a luminance value greater than a specific luminance value $T_1$, the image enhancement apparatus may determine a gamma constant as one to maintain brightness. Also, with respect to a pixels having luminance value less than or equal to the specific luminance value $T_1$, the image enhancement apparatus may determine a gamma constant to be less than one, and thus, the brightness may not be increased.

Figure 7:
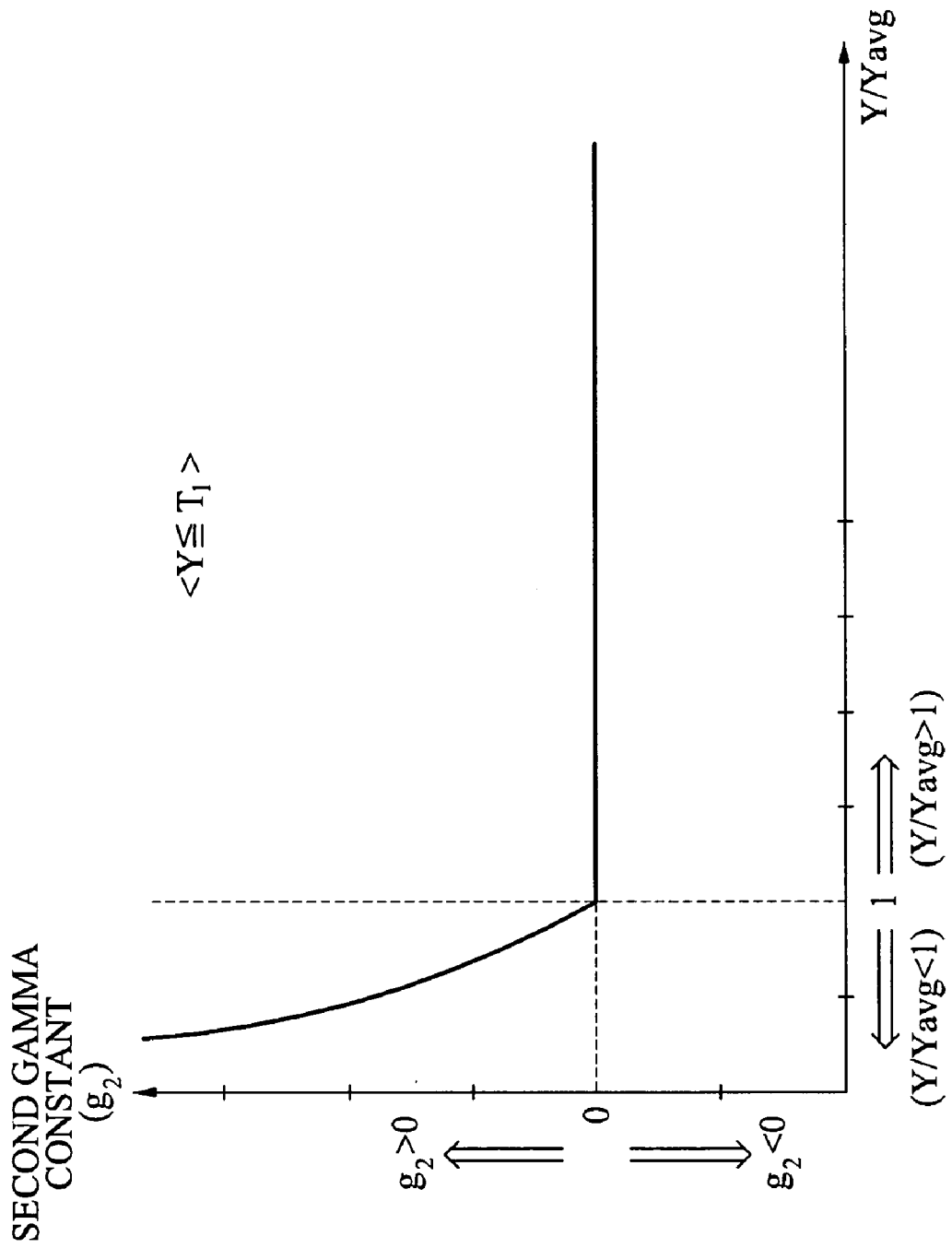
FIG. 7 illustrates an example of determining a second gamma constant based on a luminance value of a pixel and an average luminance value of a pixel according to example embodiments.

FIG. 7 illustrates an example of determining a second gamma constant based on a luminance value of a pixel and an average luminance value of a pixel according to example embodiments.

Referring to FIG. 7, there is a graph illustrating the second gamma constant according to a ratio $Y/Y_{avg}$ of a luminance value and an average luminance value with respect to each of pixels. FIG. 7 illustrates a case that a luminance value Y of each of the pixels is less than or equal to a predetermined standard luminance value $T_1$. When Y is a fixed value, $Y/Y_{avg}$ may be determined depending on $Y_{avg}$. When a certain pixel is bright compared with adjacent pixels, $Y_{avg}$ becomes a smaller value and when the specific pixel is dark compared with adjacent pixels, $Y_{avg}$ becomes a greater value. That is, a second gamma constant determining unit 502 (FIG. 5) may determine the second gamma constant $g_2$ of each of the pixels based on the luminance value and the average luminance value of each of the pixels.

As an example, the second gamma constant determining unit 502 (FIG. 5) may determine a second gamma constant $g_2$ that decreases luminance of the pixels, when the luminance value of each of the pixels is less than or equal to a predetermined standard luminance value and the average luminance value of each of the pixels is greater than the luminance value. Conversely, the second gamma constant determining unit 502 (FIG. 5) may determine a second gamma constant $g_2$ that maintains luminance of the pixels, when the luminance value of each of the pixels is less than or equal to the predetermined standard luminance value and the average luminance value of each of the pixels is less than or equal to the pixel value.

In this instance, when the average luminance value of each of the pixels is greater than the luminance value, that is, when $Y/Y_{avg}$ is less than or equal to one, the second gamma constant $g_2$ may be determined to be substantially greater than zero. Therefore, the second gamma constant determining unit 502 (FIG. 5) may determine the second gamma constant $g_2$ that decreases luminance of the pixels when the average luminance value of each of the pixels is greater than the luminance value.

Conversely, when the average luminance value of each of the pixels is less than or equal to the luminance value, that is, when $Y/Y_{avg}$ is greater than one, the second gamma constant may be determined as zero. Therefore, the second gamma constant determining unit 502 (FIG. 5) may determine the second gamma constant $g_2$ that maintain luminance of the pixels, when the average luminance value is less than or equal to the luminance value.

Here, it is assumed that $T_1$ is "128" with respect to eight bits image ("0" through "255"). Referring again to FIG. 7, when a pixel having a luminance value less than or equal to an intermediate luminance value, "128", of a maximum luminance value, "255", is brighter than adjacent pixels ($Y/Y_{avg}>1$), the image enhancement apparatus may maintain the luminance value of the corresponding pixel. Also, when a pixel having a luminance value of less than or equal to the intermediate luminance value, "128", of the maximum luminance value, "255", is darker than adjacent pixels ($Y/Y_{avg}<1$), the image enhancement apparatus may decrease the luminance value of the corresponding pixel.

Figure 8:
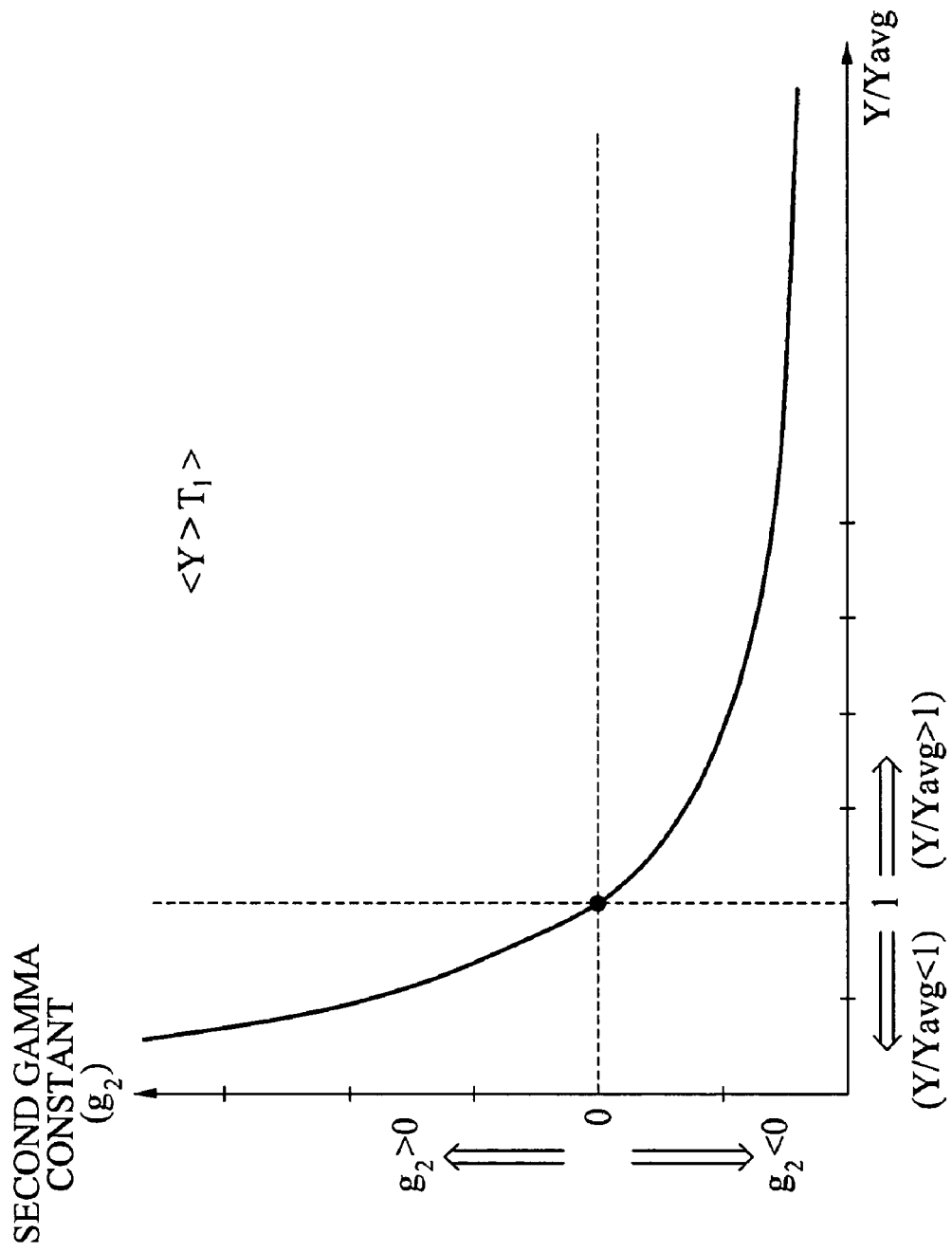
FIG. 8 illustrates another example of determining a second gamma constant based on a luminance value of a pixel and an average luminance value of a pixel according to example embodiments.

FIG. 8 illustrates another example of determining a second gamma constant $g_2$ based on a luminance value of a pixel and an average luminance value of a pixel according to example embodiments.

Referring to FIG. 8, there is a graph illustrating the second gamma constant $g_2$ according to a ratio ($Y/Y_{avg}$) of a luminance value and an average luminance value with respect to each of pixels. FIG. 8 illustrates a case that the luminance value Y of each of the pixels is greater than a predetermined standard luminance value $T_1$. When Y is a constant value, $Y/Y_{avg}$ may be determined depending on $Y_{avg}$. As a specific pixel is bright compared with adjacent pixels, $Y_{avg}$ becomes a smaller value and as the specific pixel is dark compared with adjacent pixels, $Y_{avg}$ becomes a greater value. That is, a second gamma constant determining unit 502 (FIG. 5) may determine the second gamma constant $g_2$ of each of the pixels based on the luminance value and the average luminance value of each of the pixels.

As an example, the second gamma constant determining unit 502 (FIG. 5) may determine a second gamma constant $g_2$ that decreases luminance of the pixels, when the luminance value of each of the pixels is greater than a predetermined standard luminance value and the average luminance value of each of the pixels is greater than the luminance value. Conversely, the second gamma constant determining unit 502 (FIG. 5) may determine a second gamma constant $g_2$ that increases luminance of the pixels, when the luminance value of each of the pixels is greater than the predetermined standard luminance value and the average luminance value of each of the pixels is less than or equal to the pixel value.

FIG. 8 illustrates a case that the luminance value Y of each of the pixels is greater than the predetermined standard luminance value $T_1$. In this instance, when the average luminance value of each of the pixels is greater than the luminance value, that is, when $Y/Y_{avg}$ is less than or equal to one, the second gamma constant $g_2$ may be determined to be greater than zero. In this instance, as $Y/Y_{avg}$ becomes less than one, the second gamma constant $g_2$ is determined to be a value substantially greater than zero. Therefore, the second gamma constant determining unit 502 (FIG. 5) may determine the second gamma constant $g_2$ that decreases luminance of the pixels when the average luminance value of each of the pixels is greater than the luminance value.

Conversely, when the average luminance value of each of the pixels is less than or equal to the luminance value, that is, when $Y/Y_{avg}$ is greater than one, the second gamma constant $g_2$ may be determined as a value substantially less than zero. Therefore, the second gamma constant determining unit 502 (FIG. 5) may determine a second gamma constant $g_2$ that decreases a total gamma constant, when the average luminance value is less than or equal to the luminance value, thereby increasing the luminance value of each of the pixels.

Here, it is assumed that $T_1$ is "128" with respect to eight bits image ("0" through "255"). Referring again to FIG. 8, when a pixel having a luminance value greater than an intermediate luminance value, "128", of a maximum luminance value, "255", is brighter than adjacent pixels ($Y/Y_{avg}>1$), the image enhancement apparatus may increase the luminance value of the corresponding pixel. Also, when a pixel having a luminance value greater than the intermediate luminance value, "128", of the maximum luminance value, "255", is darker than adjacent pixels ($Y/Y_{avg}<1$), the image enhancement apparatus may decrease the luminance value of the corresponding pixel.

Therefore, according to example embodiments, brightness of an image may be enhanced by a first gamma constant $g_1$ and a local contrast of the image may be enhanced by the second gamma constant $g_2$.

Figure 9:
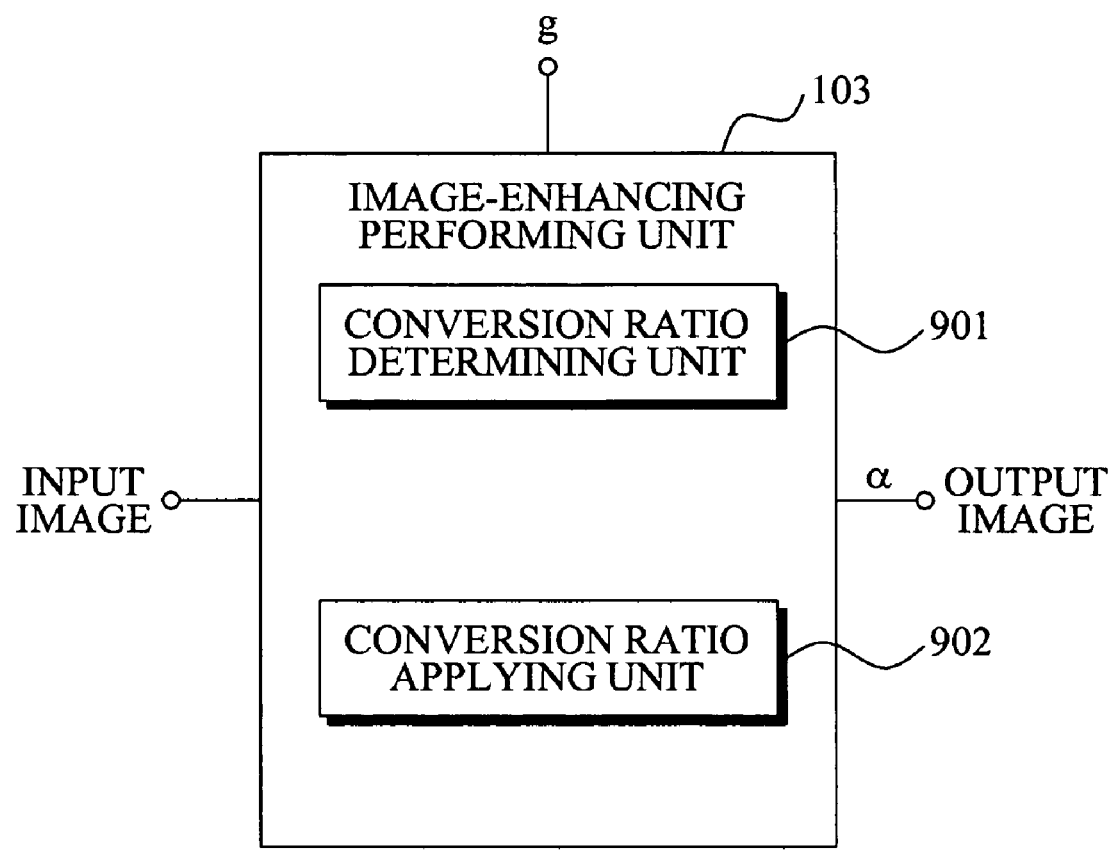
FIG. 9 illustrates a block diagram of an entire configuration of an image-enhancing performing unit, for example, the image-enhancing performing unit of FIG. 1.

FIG. 9 illustrates a block diagram of an entire configuration of the image-enhancing performing unit, for example, the image-enhancing performing unit 103 of FIG. 1.

Referring to FIG. 9, the image-enhancing performing unit 103 may include a conversion ratio determining unit 901 and a conversion ratio applying unit 902.

The conversion ratio determining unit 901 may generate a gamma curve according to a gamma constant and determine a conversion ratio between an input luminance value and an output luminance value with respect to each of pixels. In this instance, the determined gamma constant may be applied as an exponent of the gamma curve. In this instance, the gamma curve is a curve in which the conversion ratio decreases as the gamma constant increases to be greater than one and the conversion ratio increases as the gamma constant decrease to be less than one.

As an example, the gamma curve may be determined according to Equation 4, for example, given as below.

$$Y_{out} = 255 \cdot \left(\frac{y_{in}}{255}\right)^g \quad \text{Equation 4}$$

Here, $Y_{out}$ is an output luminance with respect to an input luminance $Y_{in}$ in the gamma curve. g is a gamma constant. According to Equation 4, as g becomes greater than one, $Y_{out}$ has a smaller value than $Y_{in}$, as g becomes less than one, $Y_{out}$ has a greater value than $Y_{in}$. Accordingly, the conversion ratio indicates a ratio $$\left(\alpha = \frac{Y_{out}}{Y_{in}}\right)$$

of the output luminance value to the input luminance value.

The conversion ratio applying unit 902 may apply the conversion ratio to each of color channels constituting each of the pixels of the input image. As an example, the conversion ratio applying unit 902 may apply the conversion ratio according to Equation 5, for example, given as below.

$$(R,G,B)_{out} = \alpha(R,G,B)_{in} \quad \text{Equation 5:}$$

Therefore, the input image is obtained in a form that a conversion ratio determined according to luminance data of a pixel is applied to each color channel, thereby enhancing quality of the image.

Figure 10:
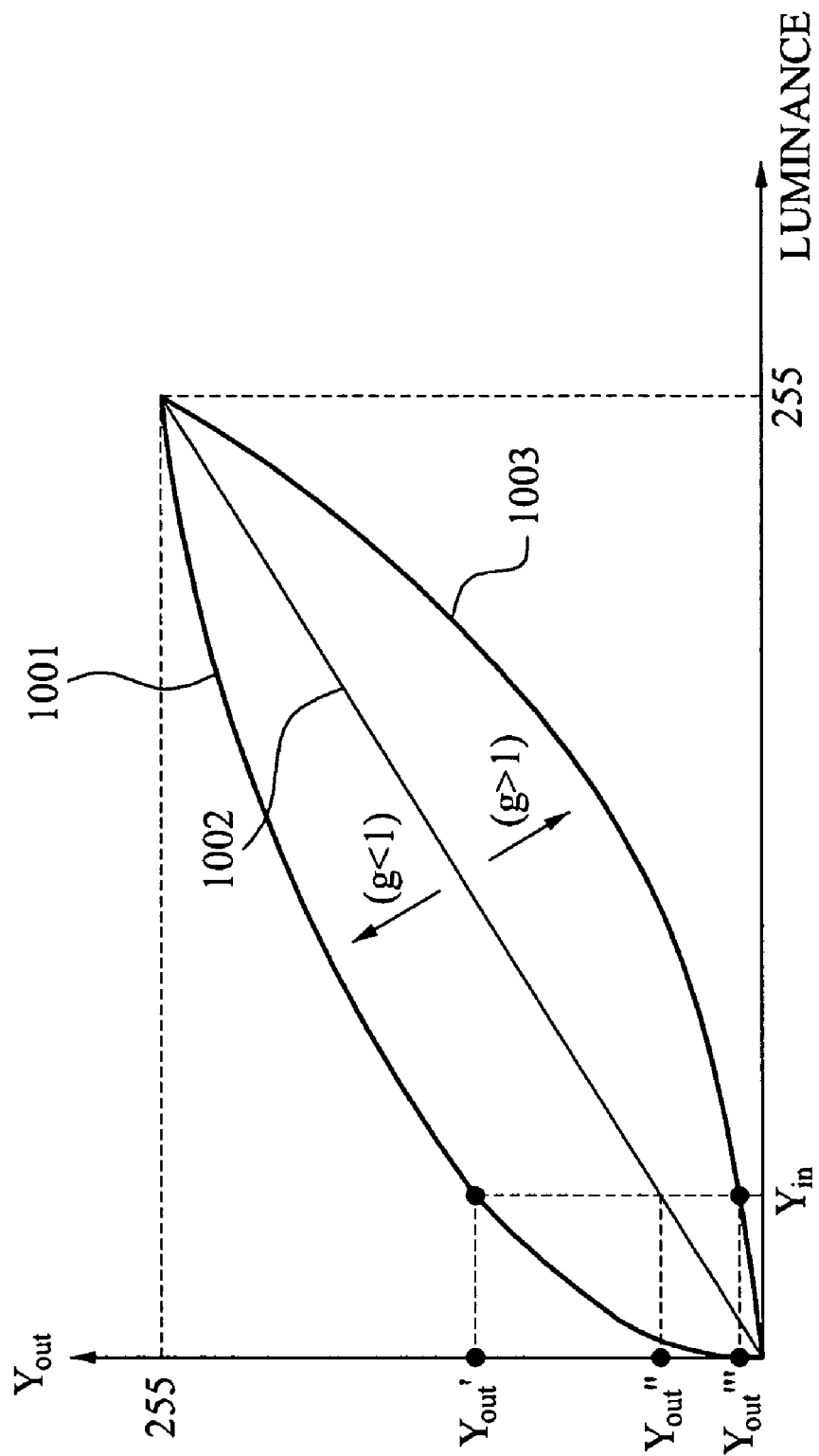
FIG. 10 illustrates a process of determining a conversion ratio based on a gamma constant according to example embodiments.

FIG. 10 illustrates a process of determining a conversion ratio based on a gamma constant according to example embodiments.

FIG. 10 illustrates a gamma curve indicating relation between an input luminance value and an output luminance value. Here, the gamma curve may be determined according to Equation 4.

When a gamma constant g is less than one, a convex gamma curve 1001 may be determined. When a gamma constant g is equal to one, a linear gamma curve 1002 may be determined, and when a gamma constant g is greater than one, a concave gamma curve 1003 may be determined. This is because that the gamma curve is in a form of an exponential function.

It is assumed that the gamma curves 1001, 1002, and 1003 may be respectively determined according to the gamma constant that the image enhancement apparatus determines when an input luminance value of each of pixels constituting the input image is $Y_{in}$. Subsequently, the output luminance value is obtained as $Y_{out}'$ with respect to the gamma curve 1001, is obtained as $Y_{out}''$ with respect to the gamma curve 1002, and is obtained as $Y_{out}'''$ with respect to the gamma curve 1003. The conversion ratio to be applied to the input image may be determined based on the input luminance value and the output luminance value. The conversion ratio may be determined independently with respect to each of the pixels constituting the input image.

Figure 11:
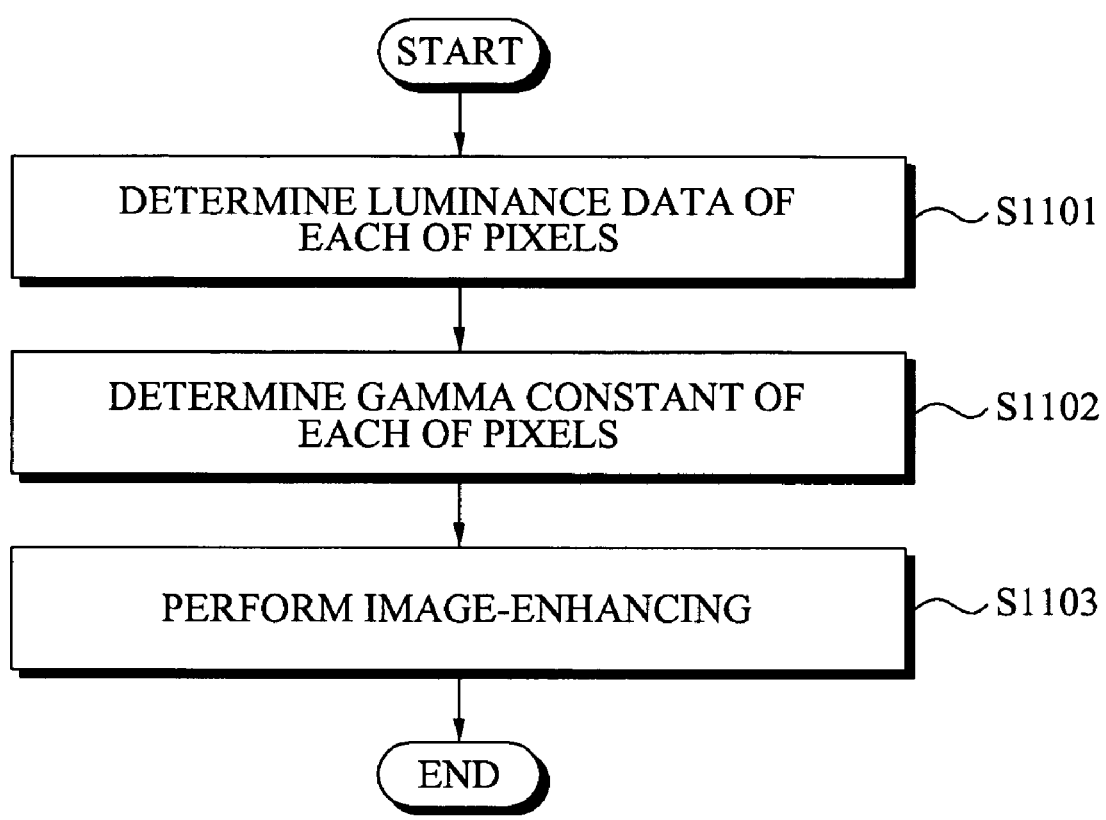
FIG. 11 illustrates a flowchart of an image enhancement method according to example embodiments.

FIG. 11 illustrates a flowchart of an image enhancement method according to example embodiments.

In operation S1101, an image enhancement apparatus may determine luminance data of each of the plurality of pixels constituting an input image.

As an example, operation S1101 may include calculating a luminance value of each of the pixels by performing luminance conversion with respect to the input image, calculating an accumulated luminance value of each of the pixels by accumulating a luminance value according to a position of each of the pixels, and calculating an average luminance value of each of the pixels using the accumulated luminance value.

In this instance, when calculating the average luminance value of each of the pixels, the image enhancement apparatus may apply a mask with respect to each of the pixels, and calculates the average luminance value with respect to the mask using the accumulated luminance value of each of pixels existing on the mask and size of the mask.

In operation S1102, the image enhancement apparatus may determine a gamma constant of each of the pixels using the luminance data. As an example, operation S1102 may include determining a first gamma constant $g_1$ of each of the pixels based on the luminance value of each of the pixels, and determining a second gamma constant $g_2$ of each of the pixels based on the luminance value and the average luminance value of each of the pixels.

In this instance, when determining the first gamma constant $g_1$, the image enhancement apparatus may determine a first gamma constant $g_1$ that increases luminance of the pixels, when the luminance value of each of the pixels is less than or equal to a predetermined standard luminance value, and may determine a first gamma constant $g_1$ that maintains the luminance value of each of the pixels, when the luminance value of each of the pixels is greater than the predetermined standard luminance value.

Also, when determining the second gamma constant $g_2$, the image enhancement apparatus may determine a second gamma constant $g_2$ that decreases the luminance of each of the pixels, when the luminance value of each of the pixels is less than or equal to a predetermined standard luminance value and the average luminance value of each of the pixels is greater than the luminance value, and may determine a second gamma constant $g_2$ that maintains the luminance of each of the pixels, when the luminance value of each of the pixels is less than or equal to the predetermined standard luminance value and the average luminance value of each of the pixels is less than or equal to the luminance value.

Also, when determining the second gamma constant $g_2$, the image enhancement apparatus may determine a second gamma constant $g_2$ that decreases the luminance of each of the pixels, when the luminance value of each of the pixels is greater than the predetermined standard luminance value and the average luminance value of each of the pixels is greater than the luminance value, and may determine a second gamma constant $g_2$ that increases the luminance of each of the pixels, when the luminance value of each of the pixels is greater than the predetermined standard luminance and the average luminance value of each of the pixels is less than or equal to the luminance value.

In operation S1103, the image enhancement apparatus may perform image-enhancing with respect to the input image using an image conversion ratio based on the gamma constant. As an example, operation S1103 may include determining a conversion ratio between an input luminance value and an output luminance value with respect to each of the pixels by generating a gamma curve according to the gamma constant, and applying the conversion ratio to each of color channels constituting each of the pixels of the input image.

In this instance, the gamma curve is a curve in which the conversion ratio decreases as the gamma constant increases to be greater than one and the conversion ratio increases as the gamma constant decrease to be less than one.

Omitted descriptions of FIG. 11 may be appreciated from the descriptions with reference to FIGS. 1 through 10

According to example embodiments, a brightness of a low luminance area in an input image is increased, and thus, visibility of a total image is enhanced.

According to example embodiments, an image conversion ratio is determined based on a luminance value of a pixel and an average luminance value with respect to a local area adjacent to a pixel, and thus, a contrast of an image is enhanced.

According to example embodiments, one-frame delay from processing a total image can be avoided and an amount of complex calculation from processing a local image is reduced, and thus, stabilized brightness and enhanced contrast with respect to a variety of images may be obtained.

In addition to the above described embodiments, embodiments can also be implemented through computer readable code/instructions in/on a medium, e.g., a computer readable medium, to control at least one processing device to implement any above described embodiment. The medium can correspond to any medium/media permitting the storing and/or transmission of the computer readable code.

The computer readable code can be recorded on a medium in a variety of ways, with examples of recording media including magnetic storage media (e.g., ROM, floppy disks, hard disks, etc.) and optical recording media (e.g., CD-ROMs, or DVDs). The computer readable code may also be transferred through transmission media as well as elements of the Internet, for example. Thus, the medium may be such a defined and measurable structure carrying or controlling a signal or information, such as a device carrying a bitstream, for example, according to one or more embodiments. The media may also be a distributed network, so that the computer readable code is stored/transferred and executed in a distributed fashion. Still further, as only an example, the processing device could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image enhancing apparatus, the apparatus comprising:
   a processor to control one or more processor-executable units;
   a luminance data determining unit to determine luminance data of each of a plurality of pixels constituting an input image;
   a gamma constant determining unit comprising:
      a first gamma constant determining unit to determine a first gamma constant of each of the pixels based on the luminance value of each of the pixels; and
      a second gamma constant determining unit to determine a second gamma constant of each of the pixels based on the luminance value of each of the pixels and an average luminance value of each of the pixels,
      wherein the gamma constant determining unit determines a gamma constant g by summing the first gamma constant and the second gamma constant; and
   an image-enhancing performing unit to perform image-enhancing upon the input image using an image conversion ratio based on the gamma constant g.

2. The apparatus of claim 1, wherein the luminance data determining unit comprises:
   a luminance calculating unit to calculate a luminance value of each of the pixels by performing luminance conversion with respect to the input image;
   an accumulated luminance value calculating unit to calculate an accumulated luminance value of each of the pixels by accumulating the luminance values according to a position of each of the pixels; and
   an average luminance value calculating unit to calculate the average luminance value of each of the pixels using the accumulated luminance value.

3. The apparatus of claim 2, wherein the average luminance value calculating unit applies a mask with respect to each of the pixels, and calculates the average luminance value with respect to a central pixel of the mask using the accumulated luminance value of pixels existing on the mask and an area of the pixels in the mask.

4. The apparatus of claim 1, wherein the first gamma constant determining unit determines the first gamma constant to increase the luminance of each of the pixels, when the luminance value of each of the pixels is less than or equal to a predetermined standard luminance value, and determines the first gamma constant to maintain the luminance of each of the pixels, when the luminance value of each of the pixels is greater than the predetermined standard luminance value.

5. The apparatus of claim 1, wherein the second gamma determining unit determines the second gamma constant to decrease the luminance of each of the pixels, when the luminance value of each of the pixels is less than or equal to a predetermined standard luminance value and the average luminance value of each of the pixels is greater than the luminance value, and determines the second gamma constant to increase the luminance of each of the pixels, when the luminance value of each of the pixels is less than or equal to the predetermined standard luminance value and the average luminance value of each of the pixels is less than or equal to the luminance value.

6. The apparatus of claim 1, wherein the second gamma determining unit determines the second gamma constant to decrease the luminance of each of the pixels, when the luminance value of each of the pixels is greater than a predetermined standard luminance value and the average luminance value of each of the pixels is greater than the luminance value, and determines the second gamma constant to increase the luminance of each of the pixels, when the luminance value of each of the pixels is greater than the predetermined standard luminance value and the average luminance value of each of the pixels is less than or equal to the luminance value.

7. The apparatus of claim 1, wherein the image-enhancing performing unit comprises:
   a conversion ratio determining unit to determine a conversion ratio between an input luminance value and an output luminance value with respect to each of the pixels by generating a gamma curve according to the gamma constant g; and a conversion ratio applying unit to apply the conversion ratio to each of a plurality of color channels constituting each of the pixels of the input image.

8. The apparatus of claim 7, wherein the gamma curve is a curve in which the conversion ratio decreases as the gamma constant g increases to be greater than one and the conversion ratio increases as the gamma constant g decreases to be less than one.

9. An image enhancing method, the method comprising:
   determining luminance data of each of a plurality of pixels constituting an input image;
   determining a first gamma constant of each of the pixels based on the luminance data of each of the pixels;
   determining a second gamma constant of each of the pixels based on the luminance value of each of the pixels and an average luminance value of each of the pixels,
   determining a gamma constant g by summing the first gamma constant and the second gamma constant; and
   performing image-enhancing upon the input image using an image conversion ratio based on the gamma constant g.

10. The method of claim 9, wherein the luminance data determining comprises:
    calculating a luminance value of each of the pixels by performing luminance conversion with respect to the input image;
    calculating an accumulated luminance value of each of the pixels by accumulating a luminance value according to a position of each of the pixels; and
    calculating the average luminance value of each of the pixels using the accumulated luminance value.

11. The method of claim 10, wherein the calculating of the average luminance value includes applying a mask with respect to each of the pixels, and calculating the average luminance value with respect to the mask using the accumulated luminance value of pixels existing on the mask and an area of the pixels in the mask.

12. The method of claim 9, wherein the determining of the first gamma constant comprises:
    determining the first gamma constant to increase the luminance of each of the pixels, when the luminance value of each of the pixels is less than or equal to a predetermined standard luminance value; and
    determining the first gamma constant to maintain the luminance of each of the pixels, when the luminance value of each of the pixels is greater than the predetermined standard luminance value.

13. The method of claim 9, wherein the determining of the second gamma constant comprises:
    determining the second gamma constant to decrease the luminance of each of the pixels, when the luminance value of each of the pixels is less than or equal to a predetermined standard luminance value and the average luminance value of each of the pixels is greater than the luminance value; and
    determining the second gamma constant to maintain the luminance of each of the pixels, when the luminance value of each of the pixels is less than or equal to the predetermined standard luminance value and the average luminance value of each of the pixels is less than or equal to the luminance value.

14. The method of claim 9, wherein the determining of the second gamma constant comprises:
    determining the second gamma constant to decrease the luminance of each of the pixels, when the luminance value of each of the pixels is greater than a predetermined standard luminance value and the average luminance value of each of the pixels is greater than the luminance value; and
    determining the second gamma constant to increase the luminance of each of the pixels, when the luminance value of each of the pixels is greater than the predetermined standard luminance and the average luminance value of each of the pixels is less than or equal to the luminance value.

15. The method of claim 9, wherein the performing of the image-enhancing comprises:
    determining a conversion ratio between an input luminance value and an output luminance value with respect to each of the pixels by generating a gamma curve according to the gamma constant g; and
    applying the conversion ratio to each of a plurality of color channels constituting each of the pixels constituting the input image.

16. The method of claim 9, wherein the gamma curve is a curve in which the conversion ratio decreases as the gamma constant g increases to be greater than one and the conversion ratio increases as the gamma constant g decreases to be less than one.

17. A non-transitory computer readable recording medium storing a program causing a computer to implement a method comprising:
    determining luminance data of each of a plurality of pixels constituting an input image;
    determining a first gamma constant of each of the pixels based on the luminance data of each of the pixels;
    determining a second gamma constant of each of the pixels based on the luminance value of each of the pixels and an average luminance value of each of the pixels,
    determining a gamma constant g by summing the first gamma constant and the second gamma constant; and
    performing image-enhancing upon the input image using an image conversion ratio based on the gamma constant g.

* * * * *